United States Patent [19]
Bennett

[11] Patent Number: 5,878,395
[45] Date of Patent: Mar. 2, 1999

[54] CODE READING TERMINAL WITH INTEGRATED VEHICULAR HEAD-UP DISPLAY CAPABILITY

[75] Inventor: James D. Bennett, Austin, Tex.

[73] Assignee: Intermec Ip Corp., Beverly Hills, Calif.

[21] Appl. No.: 761,408

[22] Filed: Dec. 6, 1996

Related U.S. Application Data

[60] Provisional application No. 60/008,425 Dec. 8, 1995.
[51] Int. Cl.[6] .................................................. G10L 9/06
[52] U.S. Cl. ......................................... 704/275; 704/272
[58] Field of Search ..................................... 704/272, 275

[56] References Cited

U.S. PATENT DOCUMENTS

| | | | |
|---|---|---|---|
| 4,902,082 | 2/1990 | Okabayashi et al. | 359/13 |
| 5,044,709 | 9/1991 | Smith et al. | 359/13 |
| 5,051,735 | 9/1991 | Furukawa | 340/705 |
| 5,056,890 | 10/1991 | Lino et al. | 359/630 |
| 5,162,928 | 11/1992 | Taniguchi et al. | 359/13 |
| 5,191,617 | 3/1993 | Bolin et al. | 381/51 |
| 5,214,413 | 5/1993 | Okabayashi et al. | 340/705 |
| 5,239,779 | 8/1993 | DeLand et al. | 49/360 |
| 5,347,425 | 9/1994 | Herron et al. | 361/686 |
| 5,410,141 | 4/1995 | Koenck et al. | 235/472 |
| 5,519,410 | 5/1996 | Smalanskas et al. | 345/7 |
| 5,532,469 | 7/1996 | Shepard et al. | 235/472 |

*Primary Examiner*—David R. Hudspeth
*Assistant Examiner*—Harold Zintel
*Attorney, Agent, or Firm*—Akin, Gump, Strauss, Hauer & Feld, LLP

[57] ABSTRACT

A portable computer terminal is disclosed which may operate in a hand-held mode and while docked within a vehicle. The terminal interacts with an illumination means therein which can be used for bar code reading and, while docked, for providing illumination for a head up display on the vehicle's windshield. Textual messages undergo text to voice conversion as well as head up display. Moreover, to provide full hands-off operation, voice recognition of predefined sets of commands is incorporated within the terminal. In another embodiment, the illumination means is placed in a housing separate from the terminal. A wireless link between the illumination means and the terminal provide for communicating text and graphics for head up display.

21 Claims, 10 Drawing Sheets

CODE READING TERMINAL WITH INTEGRATED VEHICULAR HEAD-UP DISPLAY CAPABILITY

CROSS-REFERENCE TO RELATED APPLICATIONS

The present application claims priority pursuant to 35 U.S.C. Sec. 119(e) to U.S. Provisional Application Serial No. 60/008,425 (Attorney Docket Nos. 11368US01 and DN37188), filed Dec. 8, 1995, which is hereby incorporated herein by reference in its entirety.

BACKGROUND

1. Technical Field

This invention relates to wireless communication terminals for use in vehicular mounted environments; and, more particularly, it relates to wireless communication used in vehicles which implement voice recognition and head-up display technology to provide hands-off interfacing with a driver.

2. Related Art

The use of radio transceiving devices in trucks or other automobiles is well known. Such devices typically support voice communication only, but others also or alternately enable the driver to receive textual messages. Similarly, in either implementation, the driver typically receives feedback from conventional transceiving devices in a textual form.

To display textual messages received and/or textual feedback (hereinafter "textual information"), most conventional transceiving devices employ LCD (liquid crystal display) screens. Although they could be made larger, the screens are typically as small as possible to conform to the small footprint otherwise desired for the transceiving devices. Because of the limited screen size, drivers often find the screen very difficult to read, especially in bright day-light conditions. With the small screens, the textual information displayed tends to be rather cryptic and abbreviated, adding to the reading difficulty, Compounding the problem, most conventional transceiving devices in vehicular applications are mounted out of a driver's normal field of view. Thus, to interface with such a device, drivers must look away from the road, creating a dangerous situation. Furthermore, if a driver needs to interact with such a device to enter data or commands, the driver not only looks away from the road, but also has to remove his hand or hands from the steering wheel to interact with some manual input means. Again, this creates a very hazardous situation.

In addition, when the image on the terminal's screen changes and needs to be read, it is often very difficult to gain the attention of the driver. The changes alone to the image on the screen typically does not attract a driver's attention. Beeping or buzzing sounds to gain the driver's attention may be employed but are often masked by road noise.

Hence, it would be highly desirable to solve the foregoing variety problems encountered in the use of vehicular-mounted transceiving devices.

It is an object of the present invention to provide a vehicular-mounted computing device or terminal which allows drivers to interface therewith without requiring visual or manual attention.

Another object of the present invention is to provide a vehicular-mounted computing device or terminal which brings information to a driver's attention in a non-invasive, non-hazardous manner.

Other objects, advantages, and novel features of the present invention will become apparent from the following description of the invention and claims with reference to the accompanying drawings.

SUMMARY OF THE INVENTION

These and other objects of the present invention are achieved in a terminal sized for hand-held, portable operation which also operates when inserted into a docking fixture located within a vehicle. The terminal comprises a housing in and on which all other terminal components are disposed. In particular, a screen that displays textual information is disposed on the housing, along with a means for accepting manual input. Within the housing, an illuminator assembly can be found. The illuminator assembly selectively operates to facilitate code reading when removed from the docking fixture. When docked, the illuminator assembly operates to provide head up viewing within the vehicle.

In one embodiment, the illuminator assembly comprises a scanning laser light source. In another, it comprises a high intensity light emitting array. Other types of illuminator assemblies can also be incorporated.

The terminal communicates textual information via the screen and, when inserted within the docking fixture, via the illuminator assembly. Some embodiments of the terminal further contain text to voice conversion circuitry. With such circuitry, a terminal also communicates textual information in an audible form to a driver.

Another aspect of the present invention can be found in the application of speech recognition circuitry within the terminal which accepts voice command input, permitting hands off operation of the terminal.

The illumination assembly need not be packaged within the terminal in other embodiments of the present invention. For example, a separately mounted illumination device can be located with the terminal inside a vehicle to carry out similar functionality. Within the housing of the illumination device, a means for receiving textual information from the terminal and an illuminator can be found. Also within the housing, a processor selectively delivers textual information received to the illuminator. In response, the illuminator emits images (toward the windshield of the vehicle for head up viewing) that correspond to the textual information received.

As before, the illuminator within the illumination device can comprise a scanning laser light source or a high intensity light emitting array, for example. Other types of illuminators may be utilized.

The means for receiving textual information from the computer terminal comprises a wireless transceiver in some embodiments of the present invention. In others, it comprises a wired link. Wireless capability may involve radio frequency transmissions, infrared transmissions, etc.

Any terminal may or may not be configured to support code reading depending on the specific application issue. This applies equally to embodiments in which the terminal incorporates illumination means for head up viewing and in which the illumination device is present.

Other aspects of the present invention will become apparent with reference to the remainder of the specification, drawings and claims.

DESCRIPTION OF THE PREFERRED EMBODIMENTS

Figure 1:
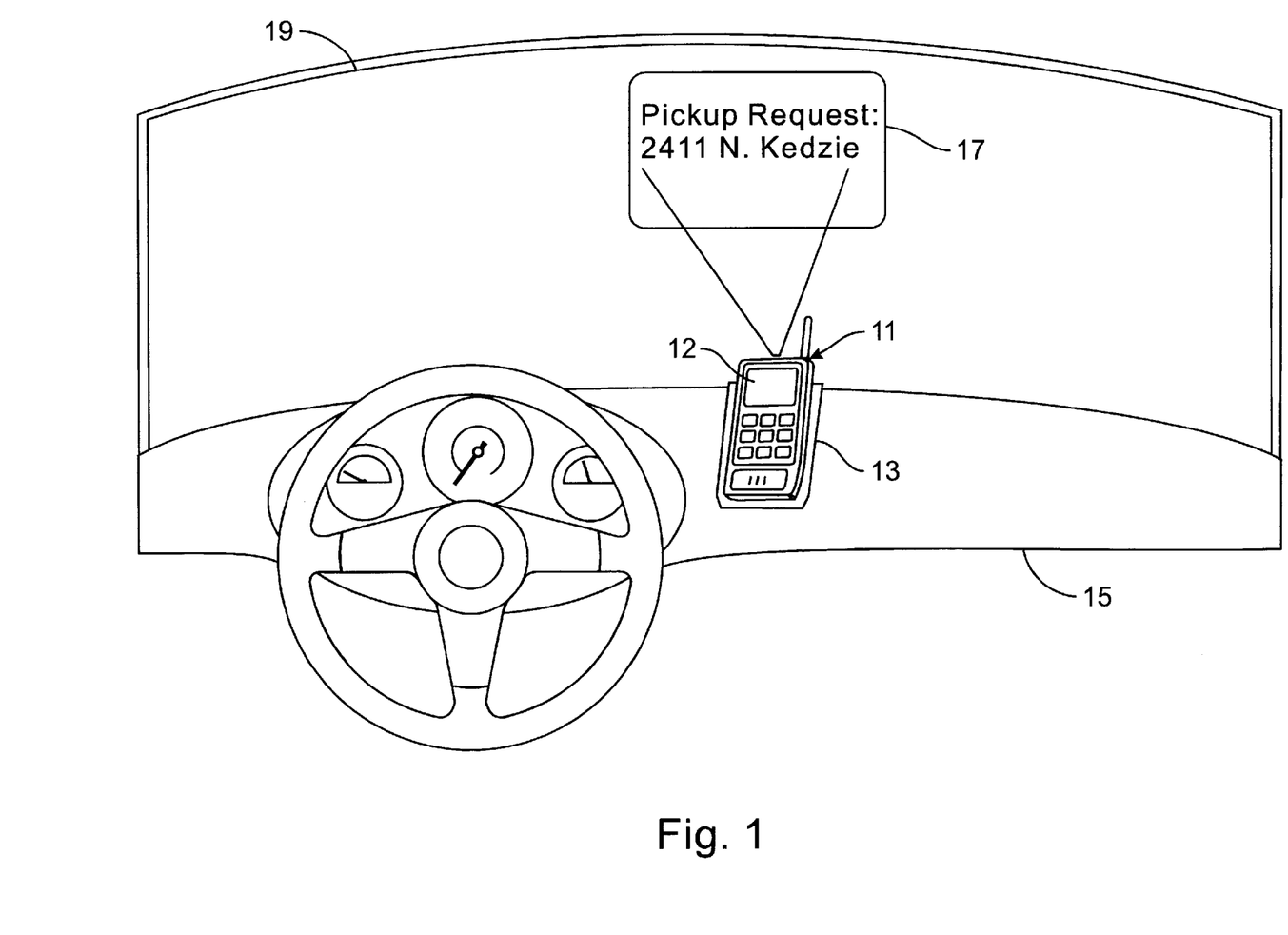
FIG. 1 is a diagram illustrating a perspective view from a driver's seat which shows an installation of a wireless, code-reading terminal built in accordance with the present invention.

FIG. 1 is a diagram illustrating a perspective view from a driver's s eat within a vehicle, showing an installation of a wireless, code reading terminal built in accordance with the present invention. A terminal 11 operates when inserted into a dock 13 on a dash board 15 of a vehicle, and when hand-held and removed from the dock 13 (not shown). When docked, the terminal 11 delivers information to the driver via: 1) a screen 12; 2) head up display; and 3) voice output. When removed from the dock 13, the terminal 11 uses all information delivery options except the head up display. Additionally, the terminal 11 is configured with voice recognition capability to provide for verbal command input.

Thus, a driver may operate the vehicle without having to manually interface with the terminal 11, and without having to read the screen 12 located outside of the driver's field of view. For added convenience however, drivers may manually interface with the terminal and utilize the screen 12 should they so choose.

The terminal 11 also performs code reading operations when removed from the dock 13. To support both head up display and code reading, the terminal 11 utilizes a single illuminator assembly. For head up display support, an illuminator assembly within the terminal 11 scans a laser light beam toward a mirror 17 affixed to a windshield 19. By selectively turning the laser light beam on and off during scanning, the terminal 11 creates a readable head up image for a driver's viewing.

Thus, drivers of such a vehicle would not have to look away from their driving field of view to read the image at the mirror 17, as would be the case if they read from the screen 12 of the terminal 11. Furthermore, the mirror 17 acts as a mirror to the scanned laser light but appears transparent to light originating outside and in front of the windshield 19. The driver is able to have nearly full access to the windshield 19 for viewing the road while still being able to view scanned images from the terminal 11.

Specifically, the mirror 17 appears substantially transparent to all light which encounters the windshield 19 at an angle nearly perpendicular to the mirror's surface. Thus, the driver can see the road and other objects in front of the vehicle through the mirror 17. However, light which encounters the mirror 17 at an angle far from perpendicular, e.g., such as at forty five degrees therefrom, is substantially reflected as is the scanned laser light image. The dock 13 is aligned so as to aim the illuminator assembly within the terminal 11 at the mirror 17 at an optimal angle for reflection.

Upon removing the terminal 11 from the dock 13, the terminal 11 disables the head up display illumination. Similarly, reinsertion into the dock 13 causes the terminal 11 to automatically enable the head up display illumination. While removed from the dock 13, the terminal 11 utilizes the services of the illuminator for the task of reading coded information such as bar codes, 2-D codes and the like. Although two illuminators could be used (one for head up display illumination and the other for code reading), utilizing a common illuminator saves cost and space while increasing reliability. Furthermore, such a time sharing arrangement is optimal because neither task competes with the other, i.e., no code reading is conducted while docked and no head up display is needed when not docked.

The terminal 11 is also configured for text to voice conversion which allows the terminal 11 to communicate textual information and messages to the driver in an audible form.

While within the dock 13, the terminal 11 responds to verbal commands from the driver, avoiding the required manual interfacing via keypad or pen entry. The terminal 11 can be removed for operation away from the vehicle using either voice, keypad or pen entry. Performance of verbal command recognition is enhanced with by reducing the number of words which need recognition, i.e., limiting to the potential word list to only the command set required for interfacing with the terminal 11.

Figure 2:
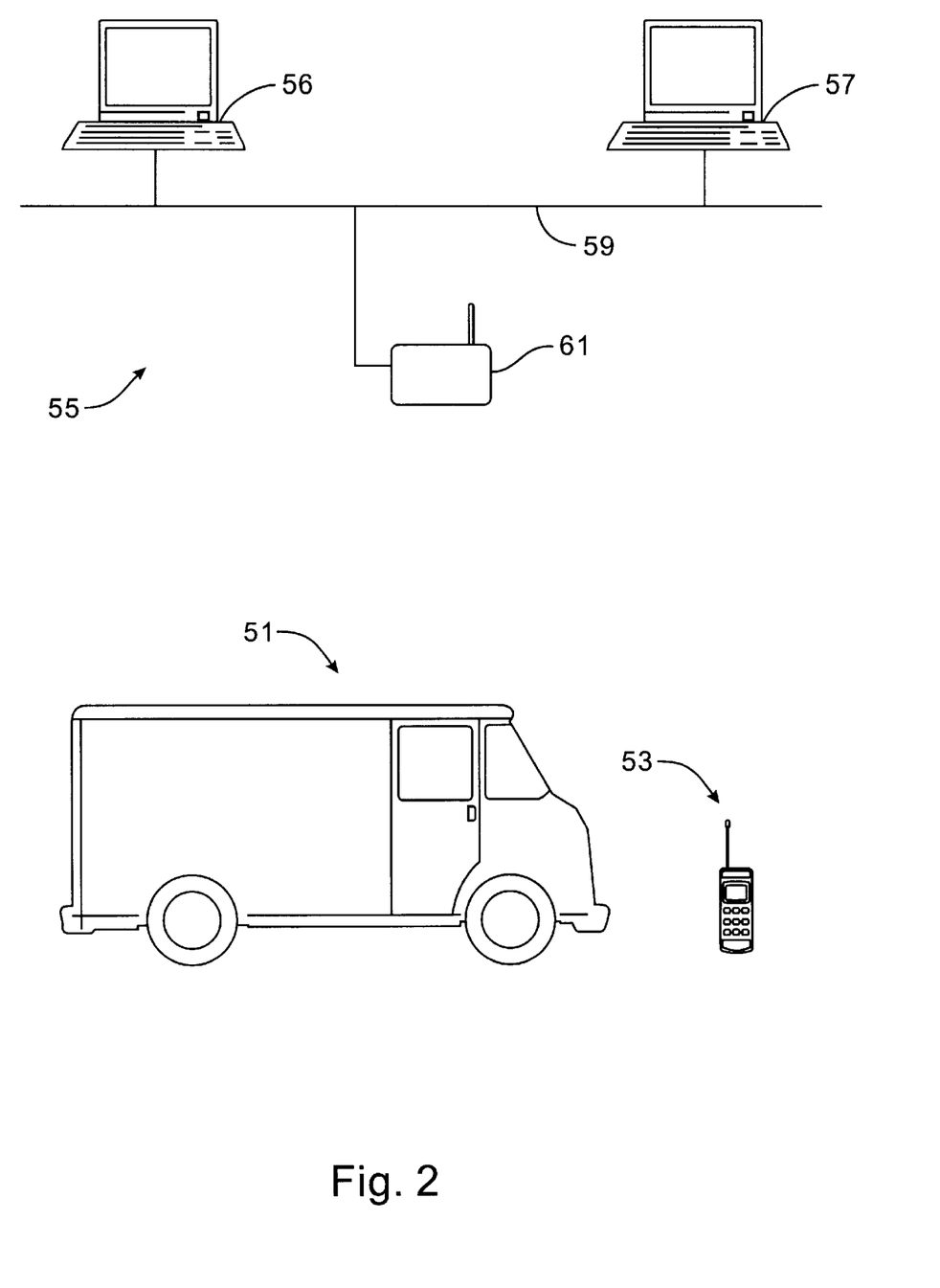
FIG. 2 is a diagram illustrating a network configuration in which the terminal of FIG. 1 participates in both vehicular mounted and portable modes.

FIG. 2 is a diagram illustrating a network configuration in which the terminal of FIG. 1 participates in both vehicular mounted and portable modes. Specifically, a vehicle 51 contains the docking configuration illustrated in FIG. 1. A terminal 53 can be removed by a driver to work at a location away from the vehicle.

A local area network 55 consists of computers 56 and 57 which intercommunicate via an Ethernet link 59, for example. A radio access point device 61 contains a WAN (wide area network) radio permitting communication between the local area network 55 and the terminal 53.

In a package deliver environment, for example, a driver wirelessly receives through the terminal 53 delivery instructions from the computer 57 via the access point device 61. The receipt of the delivery instructions occurs whether or not the terminal 53 is docked. The delivery instructions are displayed on a screen of the terminal 53 and spoken via text to voice conversion to the driver. If docked, the delivery instructions are also receive head up display. The driver can carry the terminal 53 from the vehicle 51 to the delivery destination, perform code reading if needed, and capture a signature (via pen input), for example, confirming the delivery. Thereafter, using a verbal command "send receipt", the terminal 53 responds with a verbal attempt to confirm the command inquiring "send receipt, OK?". If the terminal 53 receives a "no" as a response, the attempt is aborted. If a "yes" response is recognized, the terminal 53 responds by transmitting the captured signature along with related delivery information to the computer 56 for billing purposes via the WAN, access point device 61 and Ethernet link 59. Voice confirmation follows a successful execution of the command, i.e., indicates receipt at the computer 56.

Figure 3:
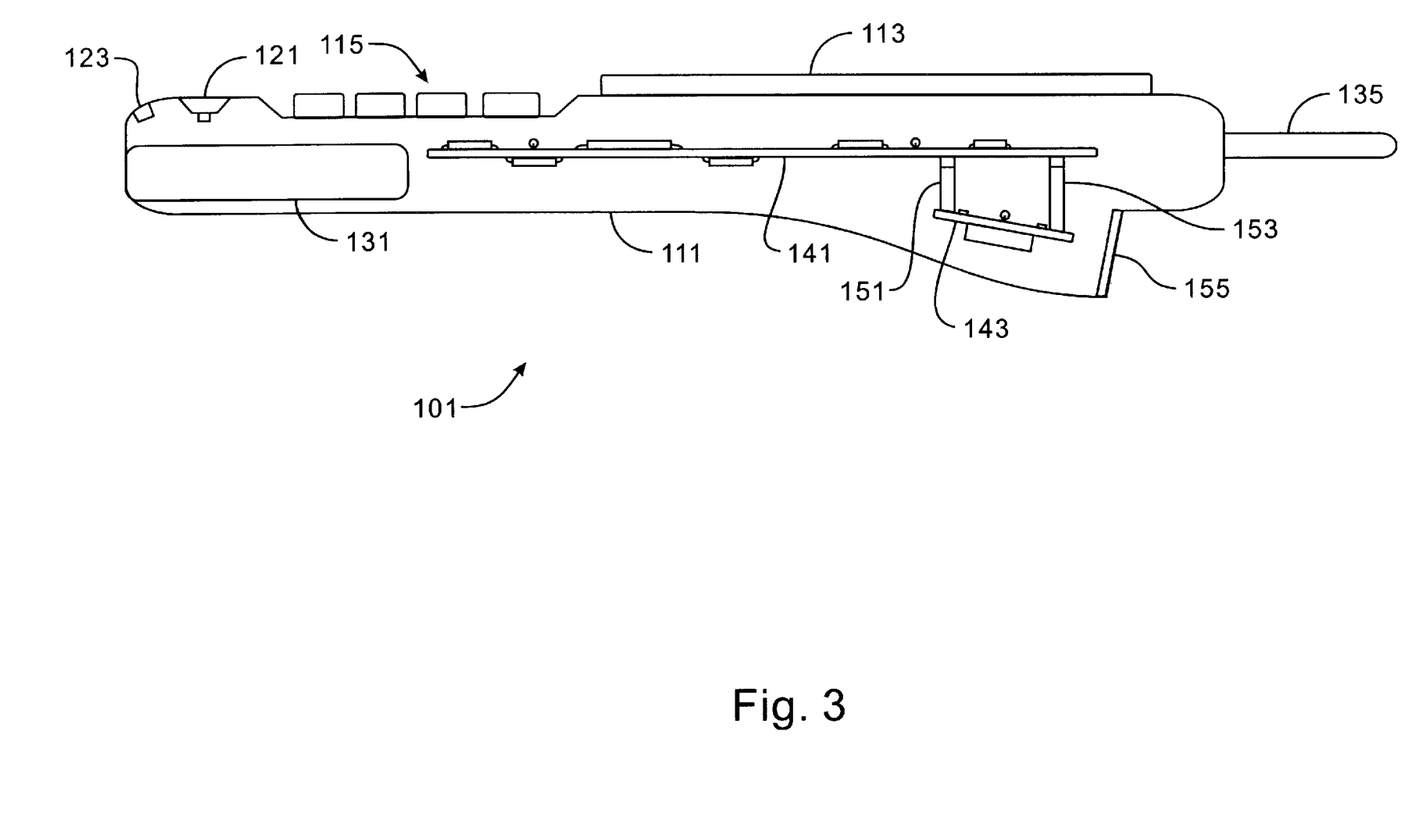
FIG. 3 is a cross-sectional diagram illustrating an exemplary circuital and structural configuration of the terminal of FIG. 1.

FIG. 3 is a cross-sectional diagram illustrating an exemplary circuital and structural configuration of the terminal of FIG. 1. Particularly, a terminal 101 has a housing 111 with all other terminal components attached thereto. An LCD display 113 provides visual feedback to a driver both when driving (although alternate means are available) and when the terminal is removed from a dock. A keypad 115 provides a manual input mechanism for the driver, preferably used when the terminal is not docked.

A speaker 121 and microphone 123 provide support for voice and sound delivery and voice recognition functionality. A battery 131 provides power to the terminal 101, and can be recharged upon insertion of the terminal 101 into a dock. The dock provides recharging energy via a link to the vehicle's battery (not shown). Wireless communication is conducted via an antenna 135.

A mother board 141 (a "printed circuit board") contains radio circuitry interfacing with the antenna 135, driver circuitry interfacing with the display 113, monitoring circuitry interfacing with the keypad 115, and sound and speech processing circuitry interfacing with the speaker 121 and microphone 123. The mother board 141 also contains a processing means which provides centralized control over the operations of the terminal 101.

An illuminator assembly 143 interfaces with the mother board 141 via connectors 151 and 153. The illuminator assembly 143 emits a scanning laser light toward a target via a window 155. When not docked, the target comprises coded information such as a 1-D (one dimensional) bar code label. When docked, the target comprises the mirror 17 (FIG. 1) disposed on the windshield of a vehicle for head up display. Thus, a single illuminator assembly 143 provides for both code reading and head up display functionality. Although two illuminator assemblies might be employed, the single illuminator assembly is preferred.

Figure 4:
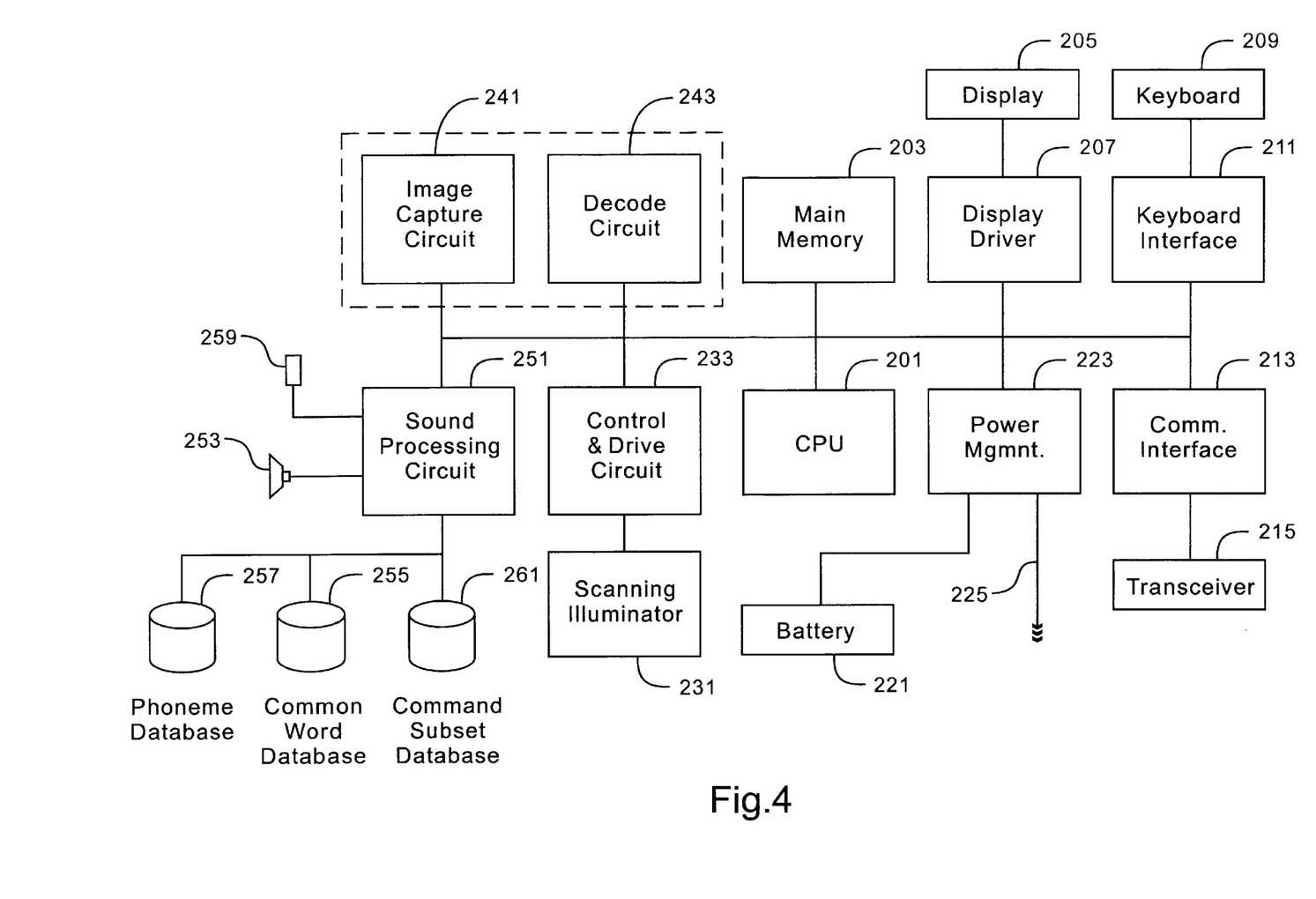
FIG. 4 is a schematic block diagram which illustrates detailed functionality of the terminal of FIG. 1 through its various circuitry.

FIG. 4 is a schematic block diagram which illustrates detailed functionality of the terminal of FIG. 1 through its various circuitry. A CPU 201 provides overall control of the terminal pursuant to software definition found within main memory 203. In particular, the CPU 201 comprises a microprocessor which operates as defined by machine code instructions stored within the main memory. The CPU 201 controls an LCD display 205 via display driver circuitry 207, and responds to manual input entered through a keyboard (or keypad) 209 and received via keyboard interface is circuitry 211. The CPU 201 also controls wireless communication is via communication interface circuitry 213 and transceiver circuitry 215.

A power management circuit 223 regulates both power delivery to the terminal and charging of a battery 221. When the terminal is not docked, the battery 221 provides power to the terminal per the control and regulation of the power management circuit 223. When docked, the power management circuit 223 utilizes power received from a vehicle's battery via a link 225 for charging the battery 221 and powering the terminal circuitry.

The CPU 201 also controls a scanning illuminator 231 via drive circuitry 233. When the terminal is docked, such control involves scanning of a textual message or an image for head up display viewing. When not docked, the scanning illuminator 231 is used to facilitate code reading.

To enable head up display scanning, the scanning illuminator 231 operates much like raster scanning within a picture tube to cover a two dimensional area (the mirror 17 of FIG. 1) with a scanned laser beam. If the laser beam remains on during the entire scanning cycle, the image would appear to be a filled box. However, an image (graphics and text) can be displayed by turning the laser beam on and off so as to create the head up image. The CPU 201 and control and drive circuit 233 interact to translate images into a control signal which turns on and off the laser beam while scanning takes place.

Code reading involves the illumination of a target code, and receiving and decoding reflections therefrom. In the present embodiment, illumination for code reading is also carried out by the scanning illuminator 231. As with head up display, the scanning illuminator 231 directs a laser beam in a scanning pattern over a two dimensional target area occupied by a code image. Reflections from the code image are sensed by an image capture circuit 241, and decoded by a decode circuit 243 through cooperation with the CPU 201.

The image capture circuit 241 contains a light intensity sensing means. In the present embodiment, the image capture circuit 241 comprises a photosensor array, although in other embodiments a phototransistor is used. Details and variations regarding the interactive operation of the CPU 201 with the drive circuitry 233, illuminator 231, capture circuit 241 and decode circuit 243 to conduct code reading are well known.

A sound processing circuit 251 supports voice recognition, text to voice conversion and sound and voice playback. Details regarding the sound processing circuit 251 are commonly known, and can be found in conventional sound cards such as those sold by Creative Labs, Inc. along with many other vendors.

Upon receiving textual messages via the transceiver 215, the CPU 201: 1) causes the message to be displayed on the display 205 through interaction with the driver circuitry 207; 2) if the terminal is docked, directs the illuminator 231 to scan the message toward the windshield is for head up viewing; and 3) causes the message to be "spoken" through interaction with the sound processing circuit 251.

To cause the message to be spoken, the CPU 201 delivers the textual message to the sound processing circuit 251. In response, the sound processing circuit 251 converts the text into a voice form for playback through a speaker 253. Conversion is typically a four step process. First, the sound processing circuit references a common word database 255 which contains an entry and corresponding voice data for most words that might occur in a given textual message. Thus, for each word in the received message which has an entry in the common word database 255, the sound processing circuit 251 extracts exact voice data for playback. Second, for those words not found in the database 255, the sound processing circuit 251 consults a phoneme database 257 to construct voice data counterparts to those words from their constituent parts. Third, once voice data for the entire textual message has been assembled, the sound processing circuit 251 modifies the voice data to provide inflections which correspond to punctuation found in the textual message. Lastly, from the voice data, the sound processing circuit 251 generates voice signals which are delivered to the speaker 253 for conversion to sound waves. With the text to voice processing, the driver hears all incoming textual information and messages without having to reference the display 205 or the head up display via the windshield.

If the driver fails to understand the spoken message, the driver can deliver a verbal command to "repeat" the message or glance at the head up display and read the message in its textual form.

Verbal commands are received by the sound processing circuit 251 via a microphone 259. The sound processing circuit 251 converts the driver's voice commands into a digital form which it compares with a set of predefined commands stored within a command subset database 261. If the comparison proves successful, the voice command is "recognized." Upon command recognition, the sound processing circuit 251 delivers the command to the CPU 201 for an appropriate response. As with the associated circuitry, specific details of such voice recognition and sound processing functionality is widely available and well known, e.g., from Dragon Systems, Inc.

Figure 5:
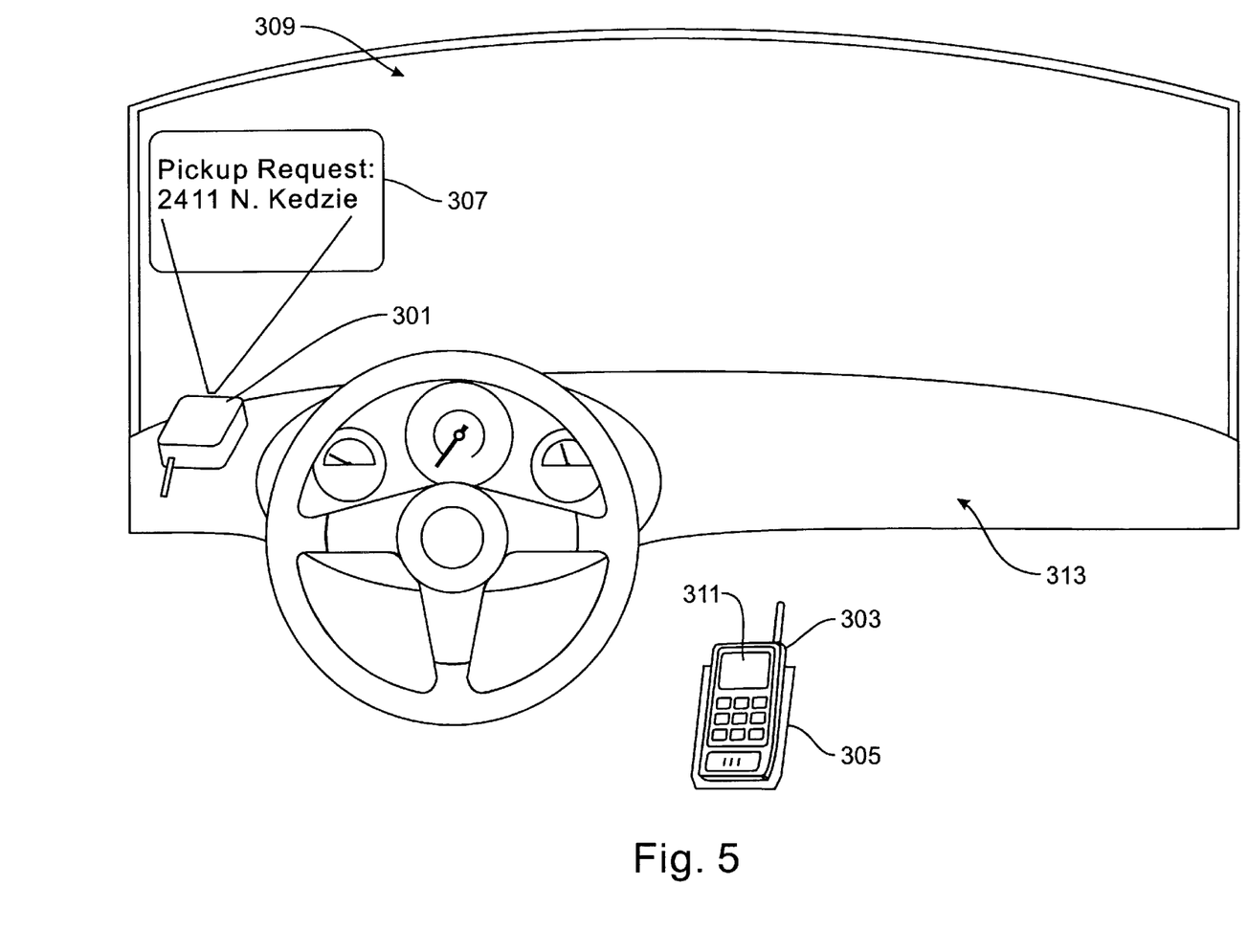
FIG. 5 is a diagram illustrating a perspective view from a driver's seat which shows an installation of an alternate embodiment of the present invention wherein a terminal remotely controls a head up display via a transceiving illumination device.

Fig. S is a diagram illustrating a perspective view from a driver's seat which shows an installation of an alternate embodiment of the present invention wherein a terminal remotely controls head up display via a transceiving illumination device. In particular, an illumination device 301 receives display control commands, text and images via a wireless link with a terminal 303. Instead of using high power transmissions required when participating on a WAN, the terminal 303 uses a much lower power transmission to communicate to the illumination device 301.

The illumination device 301 responds to the terminal 303 regarding head up display commands, text and graphics. Display control commands include clear, power on/off, scroll up/down, etc. The terminal also delivers text and graphic images along with associated display commands.

Mounted on a dash 313 at a fixed angle, the illuminator device 301 projects an image of text and/or graphics onto a mirror 307 mounted on a windshield 309 within the vehicle. Because of the steep angle of incidence, the projected image reflects from the mirror and toward a driver for head up viewing. The mirror 307 appears transparent to a driver when viewing objects in front of the vehicle. In one embodiment of the illuminator device 301, projection originates from a scanning illuminator, while in another embodiment, it originates from a reverse, text element array. Other types of illumination techniques may also be employed.

Alternately, although not shown, wired communication between the illumination device 301 and the terminal 303 can be implemented. In such a configuration, a wired link need only run between the illumination device 301 and a dock 305. Upon placing the terminal 303 into the dock, the terminal could connect to the wired link and pass commands, text and images therethrough for display.

Both the illumination device 301 and the terminal 303 receive power from the vehicle's battery while docked. The terminal 303 accesses vehicle power upon insertion into the dock 305, and utilizes self-contained battery power when removed.

As with the embodiment illustrated in FIG. 1, the terminal 303 communicates textual information to a driver via: 1) text to voice conversion; 2) head up display (when docked); and 3) LCD display on a screen 311. Voice recognition of commands is also provided. In addition, the terminal 303 may include an illuminator assembly dedicated to code reading.

Figure 6:
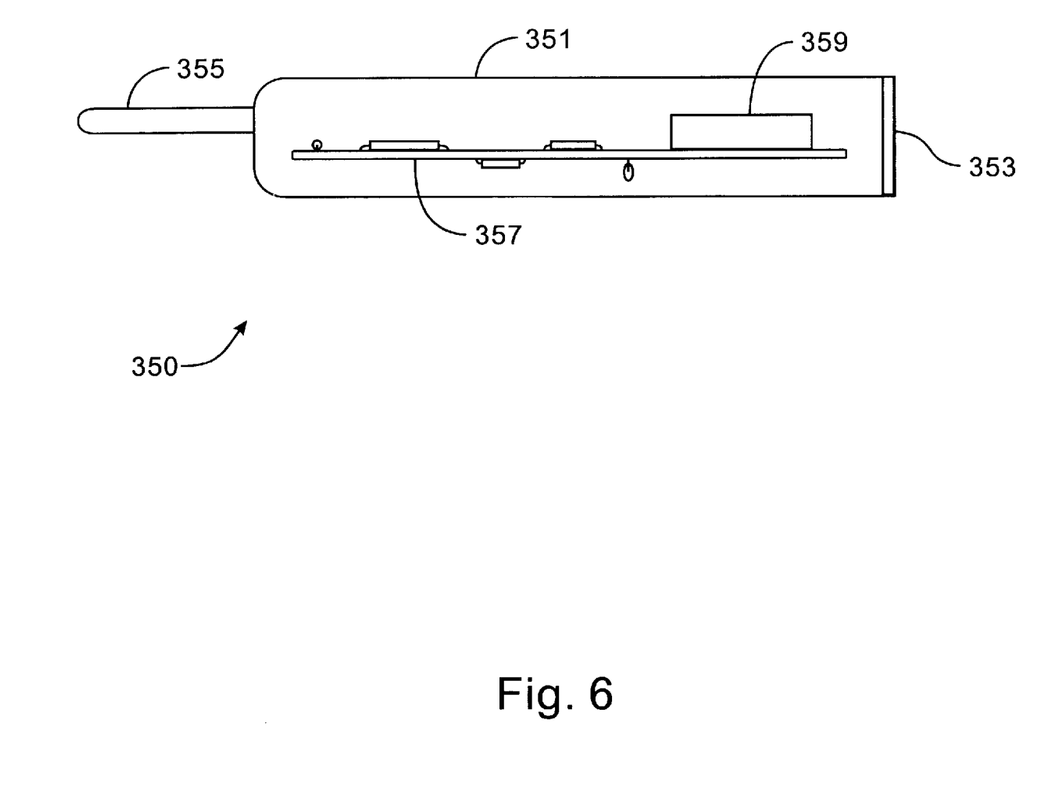
FIG. 6 is a cross-sectional diagram illustrating an exemplary circuit and structural configuration of the illumination device of FIG. 5.

FIG. 6 is a cross-sectional diagram illustrating an exemplary circuital and structural configuration of the illumination device of FIG. 5. More specifically, an illumination device 350 comprises a housing 351 to which all other components of the illumination device 350 are attached. Commands and images (which include text and/or graphics) are received by the illumination device 350 via an antenna 355 and associated receiver circuitry located on a circuit board 357. In response to the commands and images, an illuminator assembly 359 is directed to deliver images through a window 353 disposed at the front side of the illumination device 350. The projected image is aimed so as to be reflected by a mirror at the windshield. Although the illuminator assembly 359 may incorporate laser beam scanning, other illumination means may be utilized.

Figure 7:
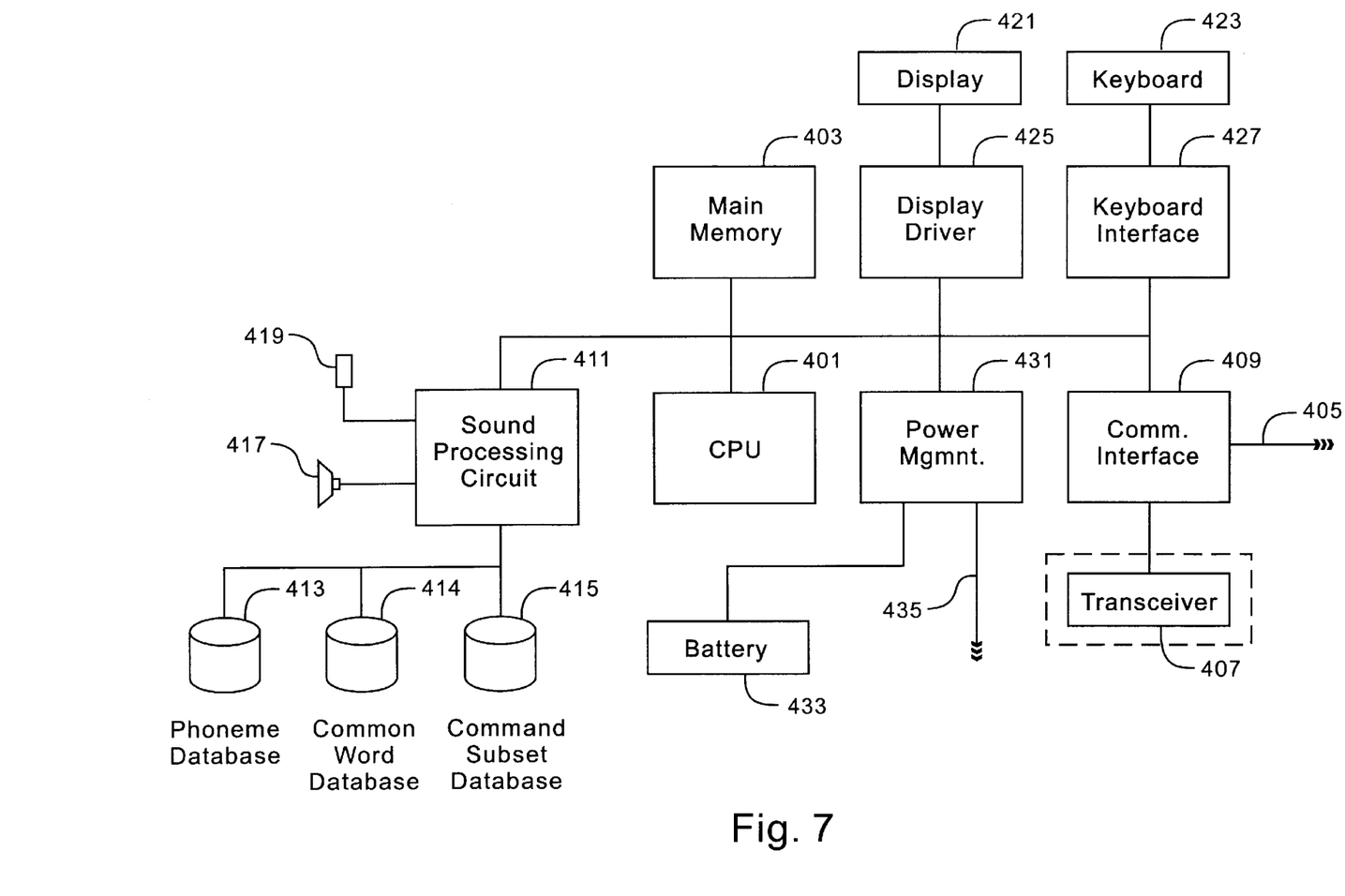
FIG. 7 is a schematic block diagram which illustrates detailed functionality of the terminal of FIG. 5 through its various circuitry.

FIG. 7 is a schematic block diagram which illustrates detailed functionality of the terminal of FIG. 5 through its various circuitry. A CPU 401 comprises a microprocessor which controls the terminal circuitry pursuant to operating instructions found within a main memory 403.

A sound processing circuit 411 and associated databases 413, 414 and 415 interact with a speaker 417 and microphone 419 to provide text to voice and voice recognition capabilities, as previously described with reference to FIG. 4. Also as previously described, the CPU 401 interacts with an LCD display 421 and keyboard 423 via display driver circuitry 425 and interface circuitry 427, respectively. A power management circuit 431 delivers power to the terminal circuitry from a battery 433 and vehicle power via a link 435 (when docked). The power management circuit 431 also charges the battery 433 when the terminal is docked.

When a textual message is received by a transceiver 407 and communicated to the CPU 401 via a communication interface 409, the CPU 401 responds in three ways. First, the CPU 401 directs the display of the textual message and any related graphics on the LCD display 421. Second, the CPU 401 sends the textual message to the sound processing circuit 411 for conversion to voice and playback via a speaker 417. Third, the CPU 401 delivers the textual message along with appropriate commands and graphic images to a remotely located illumination device. Depending on the installation, such delivery may take place via a wired link 405 or via the transceiver 407 operating in a low transmission power mode.

Figure 8:
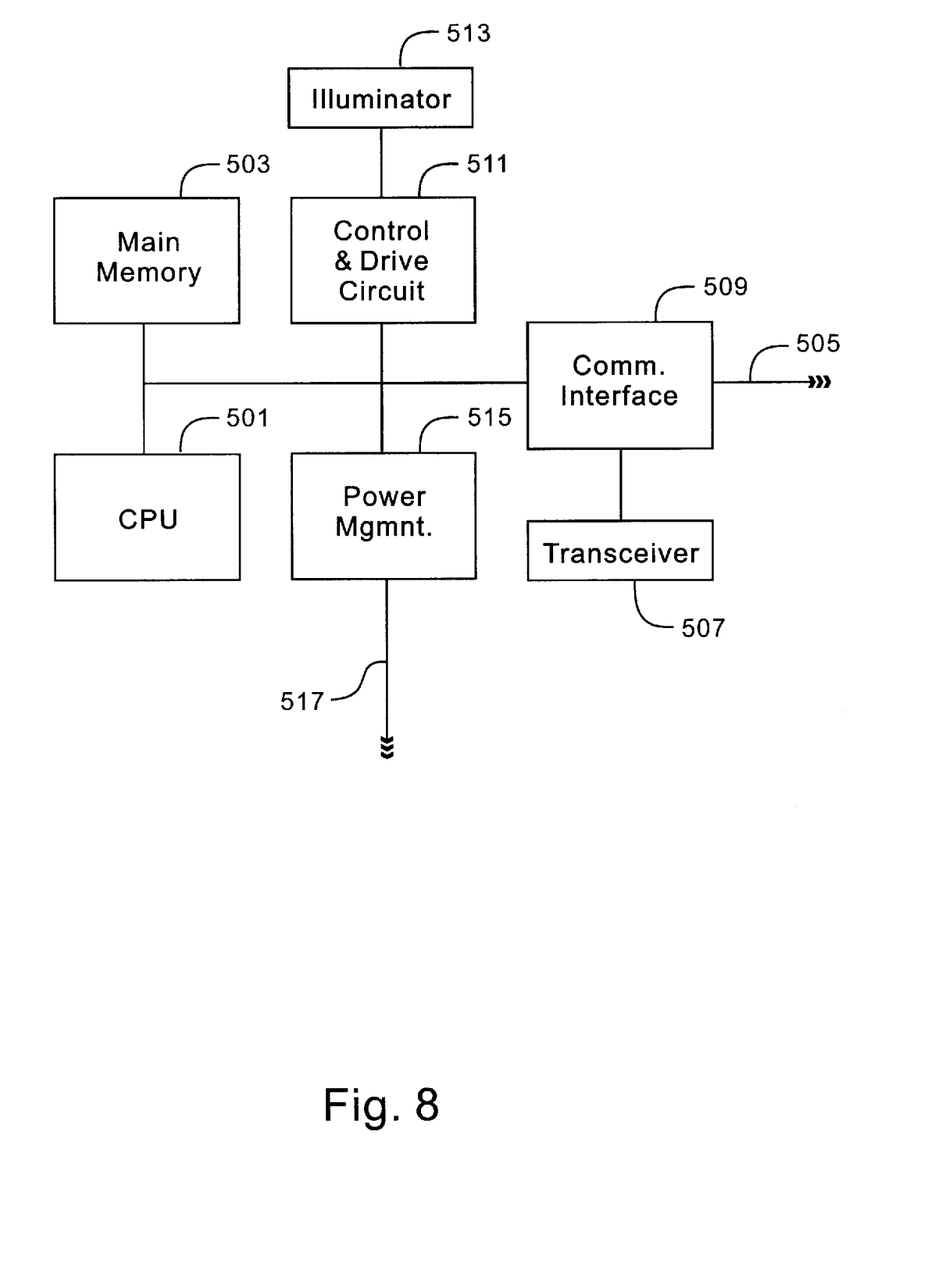
FIG. 8 is a schematic block diagram which illustrates detailed functionality of the illuminating device of FIG. 6 through its various circuitry.

FIG. 8 is a schematic block diagram which illustrates detailed functionality of the illuminating device of FIG. 6 through its various circuitry. A CPU 501 comprises a microprocessor which controls the illumination device circuitry pursuant to operating instructions stored in a main memory 503.

Through interaction with communication interface circuitry 509, the CPU 501 receives commands, text and graphics from a remotely located terminal (e.g., the terminal illustrated in FIGS. 6 and 7) via either a wired link 505 or a transceiver 407, depending on the particular installation. In response, the CPU 501 interfaces with control and drive circuitry 511 to manipulate the output of an illuminator assembly 513. Such illumination output provides for head up viewing by a driver.

A power management circuit 515 utilizes vehicle battery power from a link 517 therewith to provide regulated power to the illumination device circuitry.

Figure 9:
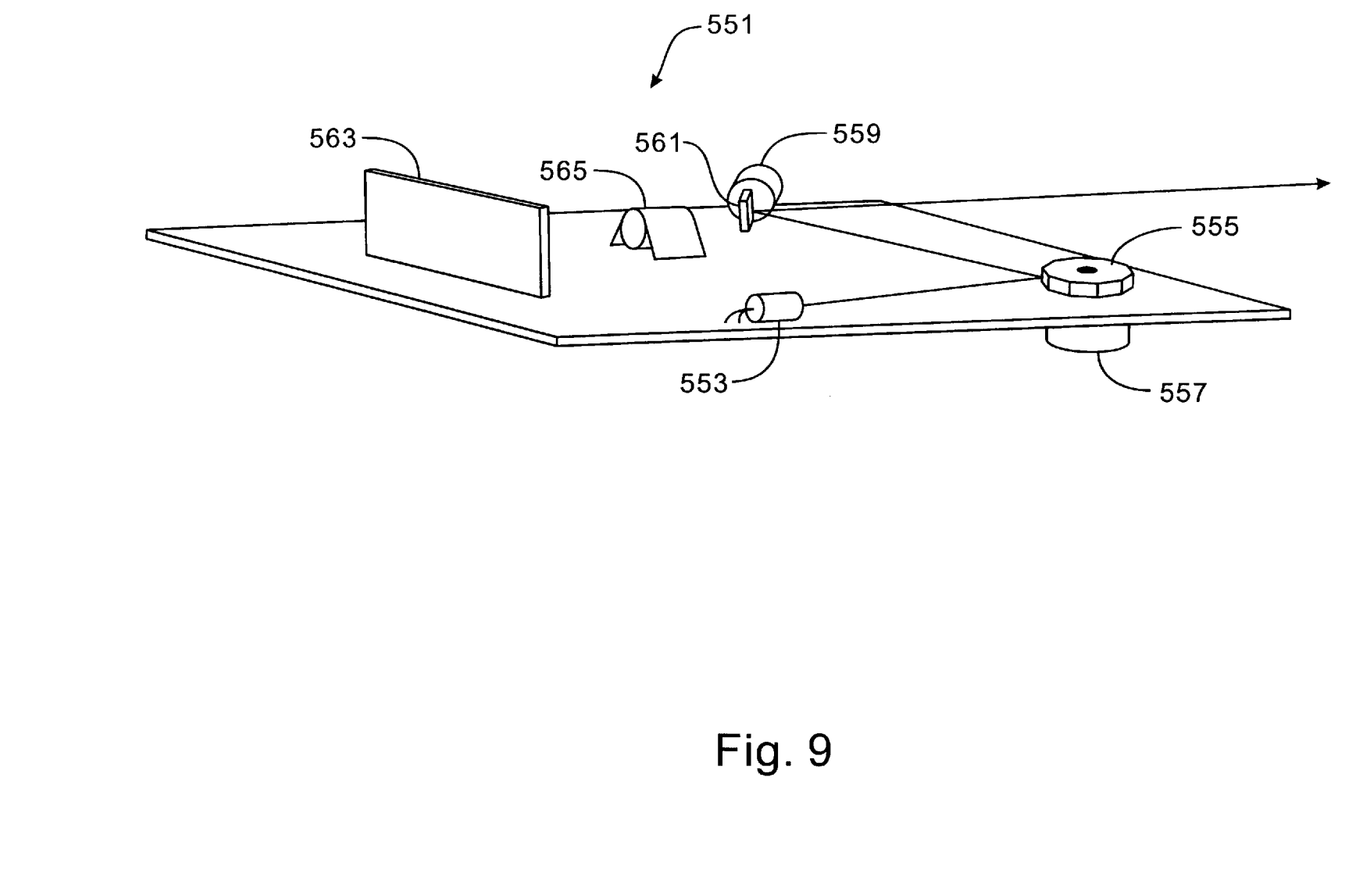
FIG. 9 is a perspective view of an illuminator assembly found in the terminal of FIG. 1 which provides a two dimensional (2-D) scanned laser output for illuminating a code image and for delivering an image toward a windshield for head up display.

FIG. 9 is a perspective view of an illuminator assembly 551 found in the terminal of FIG. 1 (or in the illumination device of FIG. 6) which provides a two dimensional (2-D) scanned laser output for illuminating a code image and for delivering an image toward a windshield for head up display. To deliver a 2-D scanning output, a laser beam emitted from a laser diode 553 is scanned from left to right and top to bottom much like that found in conventional television picture tubes.

In particular, the laser diode 553 emits a laser beam toward an octagonal mirror 555 which is rotated by a motor 557. The octagonal mirror 555 reflects the incident beam in a left/right scanning manner toward a mirror 561. The mirror 561 is attached to a bimorph motor 559 which causes the mirror 561 to twist back and forth along the axis of the motor 559. This twisting action causes the incident laser light to scan up and down. Thus, two dimensional scanning is achieved.

The scanned output of the illuminator assembly 551 is directed toward either a windshield (for head up display) or a target code image (for decoding). If head up display is the goal of the outgoing laser light, the laser diode 553 must be cycled on and off such that the scanned laser output creates the desired image of graphics and/or text. Alternately, when used for code reading, the laser diode 553 remains on during the read attempt. Reflections from the target code image of the laser beam are received by a photodetector array 563 via a lens assembly 565. The image captured by the photodetector array 563 receives further processing and decoding, i.e., an attempt to "read" the image of the code occurs, to complete the read processing.

Figure 10:
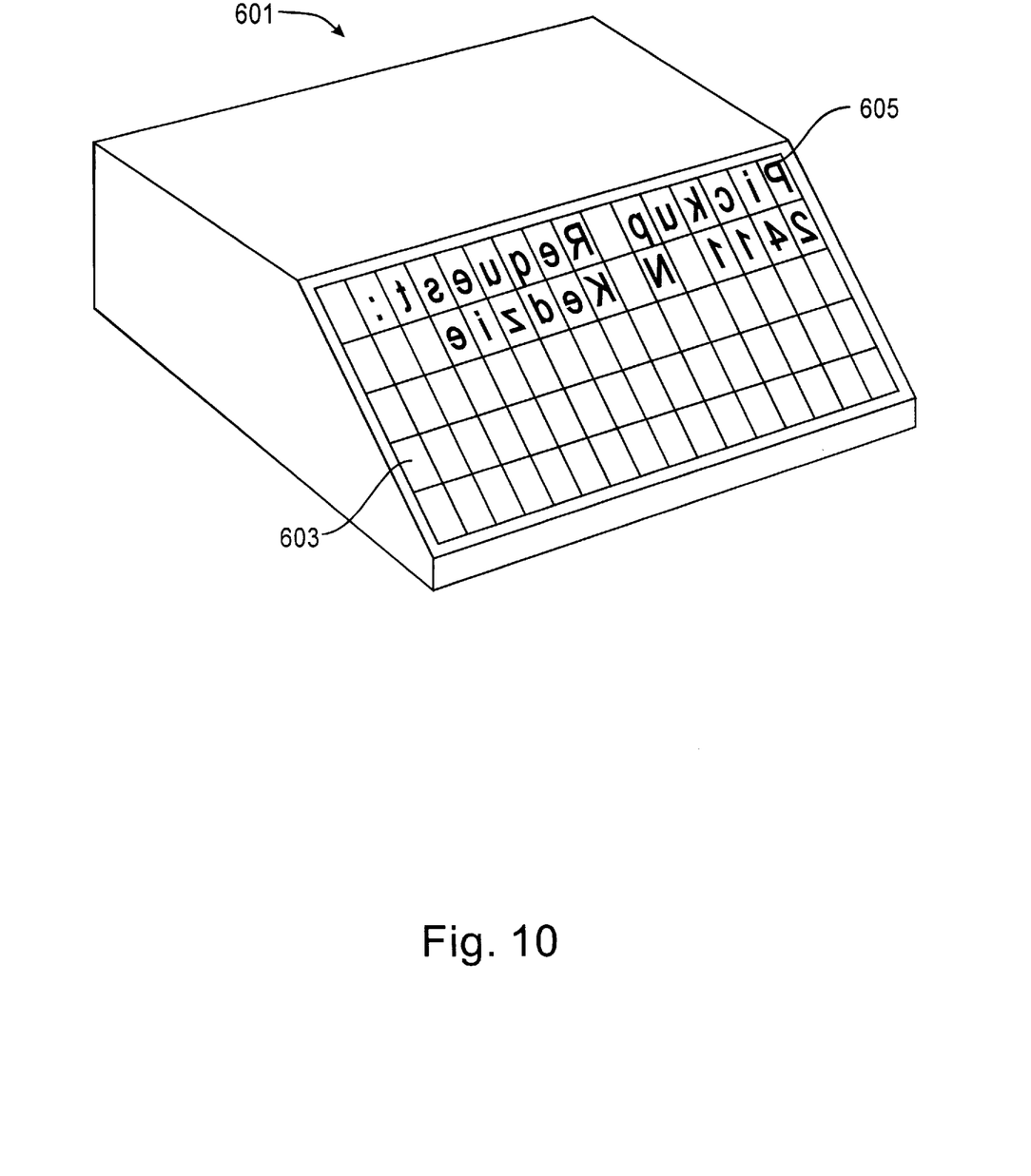
FIG. 10 is a perspective view of an alternate embodiment of an illumination device built in accordance with the present invention which utilizes a high intensity LED character array to project an image for head up display.

FIG. 10 is a perspective view of an alternate embodiment of an illumination device 601 built in accordance with the present invention which utilizes a high-intensity LED character array 603 to project an image for head up display. In particular, an array (e.g., 5 rows by 16 columns as illustrated) of segmented LED character display elements, such as an element 605 displaying the reverse image of the letter "P", can be incorporated into the illumination device 601. Each element contains a plurality of smaller LED segments which can be selectively activated to form the reverse shape of most text or punctuation, for example. Therefore, upon delivery of textual information from a terminal requesting head up display, the illumination device 601 translates the textual information into a reverse form through table lookup, and projects the reverse image of the textual information toward the window at a predefined "reflective" angle.

Additionally, illumination devices may also receive commands to display textual information originating from the vehicle's equipment as well as from a docked terminal. Display priorities can be assigned on a case by case basis, and, in such configurations, a buffer may be added within the illumination device to queue up competing display commands and information.

Because code reading capability need not be placed in any illuminator device (such functionality need only be associated, if so desired, with a terminal), the light source for projecting an image toward a windshield may take many other well known conventional forms, including that illustrated in FIG. 10. Similarly, a terminal may also be configured with the high-intensity LED character array 603 in the installation shown in FIG. 1. Such a configuration, however, requires an additional and different type of illuminator assembly such as the laser scanning assembly of FIG. 9 if code reading functionality is desired.

Moreover, it is obvious that the embodiments of the present invention described hereinabove are merely illustrative and that other modifications and adaptations may be made without departing from the scope of the appended claims.

I claim:

1. A terminal sized for hand-held, portable operation and for insertion into a docking fixture located within a vehicle, said terminal comprising:

a housing;

a screen that displays textual information disposed on said housing;

means for accepting manual input disposed on said housing;

an illuminator assembly, disposed within said housing, which selectively operates to facilitate code reading when removed from a docking fixture; and said illuminator assembly, when inserted into the docking fixture, operates to provide head up viewing.

2. The terminal of claim 1 wherein said illuminator assembly comprises a scanning laser light source.

3. The terminal of claim 1 which further comprises text to voice conversion circuitry.

4. The terminal of claim 1 wherein said terminal communicates textual information via said screen and, when inserted within the docking fixture, via said illuminator assembly.

5. The terminal of claim 3 wherein said terminal communicates textual information via said screen, said text to voice conversion circuitry, and, when inserted within the docking fixture, via said illuminator assembly.

6. The terminal of claim 1 which further comprises speech recognition circuitry for accepting voice command input.

7. A terminal sized for hand-held, portable operation and for insertion into a docking fixture located within a vehicle, said terminal comprising:

a housing;

means for accepting manual input disposed on said housing;

a wireless transceiver for receiving textual information;

a screen, disposed on said housing, that displays textual information received by said wireless transceiver; and an illuminator assembly, disposed within said housing, which operates to provide a head up display of textual information received by said wireless transceiver when said terminal is within a docking fixture.

8. The terminal of claim 7 wherein said illuminator assembly also operates to illuminate coded information to facilitate code reading.

9. The terminal of claim 7 wherein said illuminator assembly comprises a scanning laser light source.

10. The terminal of claim 7 wherein said illuminator assembly comprises a high intensity light emitting array.

11. The terminal of claim 7 which further comprises text to voice conversion circuitry.

12. The terminal of claim 7 wherein said terminal communicates textual information via said screen and, when inserted within the docking fixture, via said illuminator assembly.

13. The terminal of claim 7 wherein said terminal communicates textual information via said screen, said text to voice conversion circuitry, and, when inserted within the docking fixture, via said illuminator assembly.

14. The terminal of claim 7 which further comprises speech recognition circuitry for accepting voice command input.

15. The terminal of claim 7 which further comprises a wireless transceiver.

16. A terminal sized for hand-held, portable operation and for insertion into a docking fixture located within a vehicle, said terminal comprising;

a housing;

an illuminator assembly, disposed within said housing, which selectively operations to facilitate code reading when removed from a docking fixture; and said illuminator assembly, when inserted into the docking fixture, operates to provide head up viewing.

17. The terminal of claim 16 wherein said illuminator assembly comprises a scanning laser light source.

18. The terminal of claim 16 which further comprises text to voice conversion circuitry.

19. The terminal of claim 18, further comprising:

a screen that displays textual information disposed on said housing; and wherein said terminal communicates textual information via said screen, said text to voice conversion circuitry, and, when inserted within the docking fixture, via said illuminator assembly.

20. The terminal of claim 16, further comprising:

a screen that displays textual information disposed on said housing; and wherein said terminal communicates textual information via said screen and, when inserted within the docking fixture, via said illuminator assembly.

21. The terminal of claim 16 which further comprises speech recognition circuitry for accepting voice command input.

* * * * *